Feb. 17, 1925.
S. C. DODD
1,527,126
INTELLIGENCE TESTING APPARATUS
Filed July 23, 1924
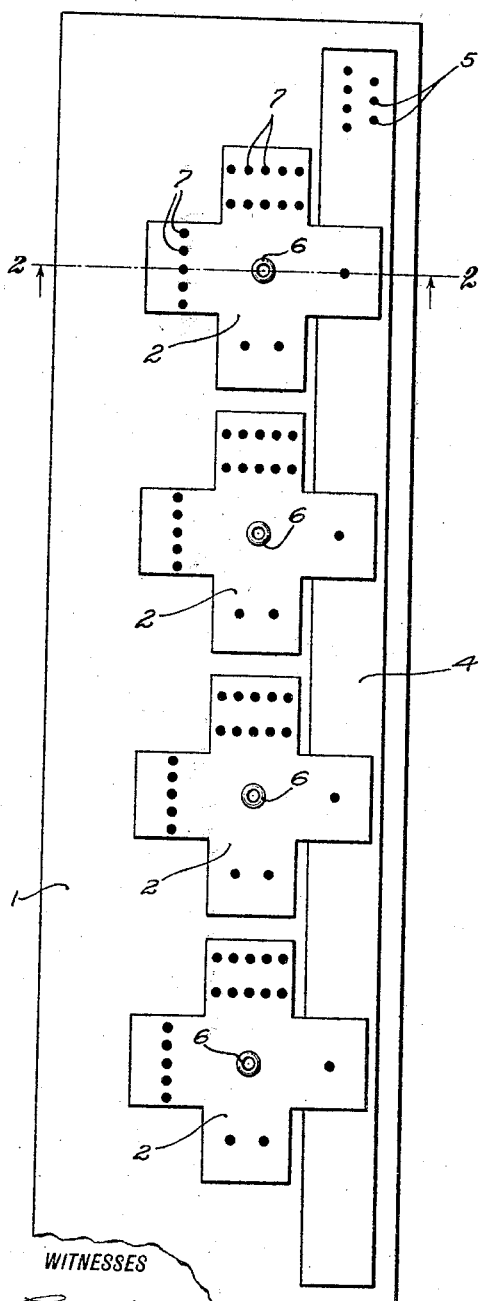
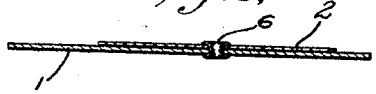
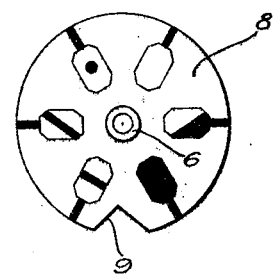
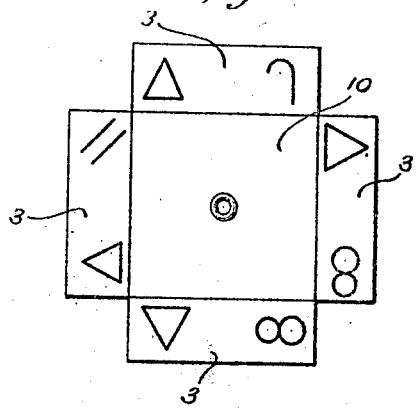
WITNESSES
INVENTOR
STUART C. DODD
BY
ATTORNEYS Patented Feb. 17, 1925.

1,527,126

UNITED STATES PATENT OFFICE.

STUART CARTER DODD, OF PRINCETON, NEW JERSEY.

INTELLIGENCE-TESTING APPARATUS.

Application filed July 23, 1924. Serial No. 727,745.

*To all whom it may concern:*

Be it known that I, STUART CARTER DODD, a citizen of the United States, and a resident of Princeton, in the county of Mercer and State of New Jersey, have invented a new and Improved Intelligence-Testing Apparatus, of which the following is a full, clear, and exact description.

This invention relates to intelligence testing apparatus, an object of the invention being to provide an apparatus which may be of the desired form, which is movable upon or relative to a column, space, station or other co-operating registering indicia preferably upon a field so that by moving the device or devices they can be utilized to give solutions to problems or to indicate answers of various sorts. With the use of such an apparatus in a mental test, a problem (or series of problems) is presented to a subject in words, gestures, pictures or objects, and in the controlled response several solutions are offered from which the subject is to select the one he thinks appropriate.

An object of the invention is to provide an apparatus to dispense with the necessity of using a pencil, pen or the like, and in lieu thereof I provide a rotator pivotally mounted at its center and which may be of the desired form with various responses indicated by pictures, or symbols, on it.

With these and other objects in view, the invention consists of certain novel features of construction and combinations and arrangements of parts which will be more fully hereinafter described and pointed out in the claims.

In the accompanying drawings—

Figure 1 illustrates in plan one embodiment of my invention;

Figure 2 is a view in transverse section on the line 2—2 of Figure 1;

Figures 3 and 4 are plan views illustrating a modified form of rotator.

Referring more particularly to Figures 1 and 2, 1 represents a support which may constitute a plate, sheet, or other support which constitutes a field on which a plurality of series of rotators 2 are mounted. These rotators may each be in the form of a cross, as indicated in Figure 1, or they may be circular, as shown in Figure 3, or they may be rectangular with projected sections 3, as shown in Figure 4.

On the field 1, a column or registering station 4 is provided with which the rotators register. This column or station may be formed by an oblong figure, as indicated, and in the illustration in Figure 1 a number of dots 5 are provided on the column which presents a problem in addition for the student to answer by moving the rotators.

The rotator preferably has a central rotary mounting 6 which may constitute a rivet or staple extending through the rotator and through the board or field 1. The respective ends of the cross-shaped rotators contain dots 7 in various numbers, so that in answering the problem it is necessary for the student to turn the several rotators to bring the ends of the crosses in register with the column so that the number of dots on such ends will total the number of the problem given.

In the illustration I have shown the rotators with one-dot end upon the column. This manifestly is a wrong answer, and it is necessary for a student to turn three of the rotators so as to bring the three two-dot ends into register with the column to total the number 7.

In Figure 3 a circular form of rotator 8 is illustrated as a modification, having a notch 9 therein to facilitate its turning, and this rotator contains symbols which may be employed instead of numbers or dots.

In Figure 4 I illustrate a rotator 10, which is of general rectangular form having projected end portions 3 containing letters, numerals and symbols of any kind, which may be brought to a registering point in answer to a problem.

The modifications illustrated in Figures 3 and 4 are intended for use in an analogous manner in the illustration of Figure 1, but it is, of course, to be understood that the backing sheet would contain characters or symbols which register with or in other manner presents a problem to be answered with the symbols of the rotary devices.

It is to be understood that the dots or numbers 5 on the column 4 can be changed after erasure or otherwise, or that an entirely new slip forming a new column 4 may be inserted under the rotating devices to present new problems. To answer the problem 7 the three lowermost rotary devices will be turned to bring the ends having two dots thereon onto the column 4 so that the total dots on the column will be seven.

It is obvious that in the drawings I illustrate very simple embodiments of my invention, but I believe that I am the first to provide an intelligence testing apparatus in which a series of movable devices are provied for registering with a space so that an answer to a problem may be indicated by the proper positioning of these several movable devices, and hence I do not wish to be limited to the precise details set forth but consider myself at liberty to make such slight changes and alterations as fairly fall within the spirit and scope of the appended claims.

I claim:

1. An apparatus of the character described, comprising a field, a space on the field containing a problem, and a series of rotators on the field having end portions adapted to be moved onto the space and containing indicia adjacent the respective edges thereof.

2. An apparatus of the character described, comprising a field, a space on the field containing a problem, a series of cross-shaped rotators on the field having the end portions adapted to be moved onto the space and containing indicia adjacent the respective edges thereof, and staples through the center thereof and fixed to the field whereby the cross-shaped rotators are freely movable.

STUART CARTER DODD.